(12) United States Patent
Van Cleve

(10) Patent No.: US 6,397,684 B1
(45) Date of Patent: Jun. 4, 2002

(54) LOW THERMAL STRESS CASE CONNECT LINK FOR A STRAIGHT TUBE CORIOLIS FLOWMETER

(75) Inventor: Craig Brainerd Van Cleve, Lyons, CO (US)

(73) Assignee: Micro Motion Inc., Boulder, CO (US)

( * ) Notice: Subject to any disclaimer, the term of this patent is extended or adjusted under 35 U.S.C. 154(b) by 0 days.

(21) Appl. No.: 09/256,642

(22) Filed: Feb. 23, 1999

(51) Int. Cl.[7] .................................................. G01F 1/84
(52) U.S. Cl. .................................................. 73/861.357
(58) Field of Search ........................ 73/861.355, 861.356, 73/861.357, 861; 181/223, 241

(56) References Cited

U.S. PATENT DOCUMENTS 5,287,754 A * 2/1994 Kazakis ................. 73/861.355
5,398,554 A * 3/1995 Ogawa et al. ......... 73/861.357
5,850,039 A 12/1998 Van Cleve et al.
6,170,339 B1 * 1/2001 Van Der Pol et al. .. 73/861.357

FOREIGN PATENT DOCUMENTS

EP 0 759 542 A1 2/1997

* cited by examiner

Primary Examiner—Harshad Patel
(74) Attorney, Agent, or Firm—Faegre & Benson LLP

(57) ABSTRACT

Case connect links of a straight tube Coriolis flowmeter couple a balance bar/flow tube junction to the flow tube case. Each case connect link has at least one out of plane bend in its surface to allow the case connect link to expand/contract in response to temperature differentials between the internal elements of the flowmeter. The expansion/contraction permitted by the out of plane bend prevents structural damage to the case connect link as well as to the flowmeter elements to which it is connected.

13 Claims, 3 Drawing Sheets

LOW THERMAL STRESS CASE CONNECT LINK FOR A STRAIGHT TUBE CORIOLIS FLOWMETER

FIELD OF THE INVENTION

This invention relates to a straight tube Coriolis flowmeter and in particular to a case connect link that provides decreased thermal stress for a straight tube Coriolis flowmeter.

PROBLEM

It is known that the elements internal to a straight tube Coriolis flowmeter are subject to stress when the flowmeter is subject to conditions in which temperature differentials are developed within a part or between various parts of the flowmeter. These temperature differentials can cause a part to expand/contract and either damage itself or other parts to which the expanding/contracting part is coupled. For example, the expansion/contraction of the flow tube by an amount different than the expansion/contraction of the flowmeter elements to which the flow tube is connected can stress the flow tube beyond the limits of its permissible deformation. Thus, if the flow tube expands an excessive amount with respect to the case and its end flanges, the flow tube may buckle. Conversely, if the flow tube contracts an excessive amount with respect to the case end flanges, it may develop cracks or tears or it may yield and be permanently deformed.

Attempts have been made to minimize problems associated with thermal contractions/expansion in flow tubes of Coriolis flowmeters. One solution utilizes materials having similar coefficients of expansion so that the expansion/contraction among all elements is uniform. Another solution uses a prestressed flow tube so it can change in length a modest amount without excessive internal stresses. Another solution uses bellows near the flow tube ends so the flow tube can change in length without undo stress. Another solution provides bends in the flow tube so that length changes are absorbed by the flow tube segment containing the bend. Another solution slidably mounts the ends of the flow tube to the case ends. These solutions reduce the problems associated with thermally induced length changes of the flow tube with respect to the elements of the flowmeter to which the flow tube is connected. However, these solutions have not solved the problems of thermally induced diameter changes in the flow tube. These diameter changes cause stresses in other Coriolis flowmeter elements including those that couple the flowmeter case to the vibratory elements of the flowmeter including the flow tube and its surrounding balance bar.

It is known to use case connect links to couple the vibratory end nodes of a flow tube to the flow tube case. This is done to prevent the end nodes from vibrating excessively during conditions of unbalance. Excessive vibration of the end nodes is undesirable because it causes changes in the flow sensitivity of the meter. Undesirable vibratory deflections at the brace bar (wherein the end nodes reside) is prevented by coupling the brace bar to a connecting link oriented transversely to both the vibratory direction of the flow tube and the axial direction of the flow tube. One end of the case connect link is connected to the case inner wall; the other end of the case connect link is connected to the brace bar or the end of the balance bar. The prior art case connect link is a relatively thin planar leaf spring member which is flexible in a twist mode and does not inhibit the rotation of the flow tube and balance bar at the desired vibration nodes. However, the case connect link prevents the end nodes from translating in the drive direction under conditions of unbalance. Each link prevents its respective end node from translating by rigidly coupling the end node to the relatively large mass of the case. The case connect link thereby improves the accuracy of the meter in measuring materials of higher or lower density than the nominal. A flowmeter having a case connect link of this type is shown in patent EP-0759542A1, published Feb. 26, 1997.

In Coriolis flowmeters of the straight tube type that employ case connect links, the flow tube extends for the entirety of the length of the flow meter with the flow tube ends being connected to case end flanges. The balance bar is typically parallel to the flow tube and may either be a separate parallel member or a cylindrical member surrounding the flow tube. The balance bar is shorter in length than the flow tube so that each end of the balance bar is connected by a brace bar to a near end portion of the flow tube. The brace bar typically is a relatively short circular member that extends transversely from the balance bar end to the near end location of the flow tube.

The vibratory node of the flow tube/brace bar combination normally resides in the brace bar during conditions of vibratory balance. Without case connect links, when materials of a relatively higher or relatively lower than nominal density flow in the flow tube, the vibratory node may move from the brace bar axially inward towards the flow tube center for heavy material or axially outward towards the end flanges for relatively light materials. These conditions of vibratory unbalance cause the brace bar to vibrate as part of the vibratory system and, in so doing, to shorten or lengthen the vibrating length of the flow tube to which it is connected. This change in length of the active portion of the flow tube is undesirable since it produces undesired changes in the flow sensitivity of the flow meter by altering the distance between the nodes and the pickoffs.

The use of case connect links positioned transversely with respect to the drive direction of the flow tube and the tube axis forces the vibration nodes of the flow tube/brace bar/balance bar combination to remain in the brace bar. The use of case connect links achieves the goal of minimizing undesired vibrations of the brace bar regions within the flow meter during conditions of vibratory unbalance associated with the processing of heavier or exceedingly light materials.

Although the use of case connect links minimizes undesired vibrations in straight tube Coriolis flowmeters, the case connect links are subject to structural damage when the temperature of the material in the flow tube differs from the case temperature. Under such conditions, the brace bar end of the case connect links may move in the radial direction a different distance than the case end due to different amounts of thermal expansion/contraction of the flow tube diameter. This results in the case connect links being subject to compressive or tensile loads that may stress and damage them or the elements to which they are connected.

It can therefore be seen that it is a problem to minimize structural damages to these case connect links resulting from differing amounts of thermal contractions/expansions of the case and the brace bar region.

It can be seen from the above that an aspect of the invention is a Coriolis flowmeter comprising:
 a flow tube;
 a balance bar oriented substantially parallel to the longitudinal axis of said flow tube;
 first and second ends of said balance bar coupled to opposing near end portions of said flow tube;

a case containing said balance bar and said flow tube;

case connect link means coupling said first and second ends of said balance bar to an inner wall of said case;

at least one out of plane bend in said elongated case connect link means for enabling changes in the effective dimension of said case connect link means in response to thermal differences between said flow tube and said case.

Another aspect is that said flow tube is substantially straight.

Another aspect is that said balance bar is substantially cylindrical and surrounds said flow tube.

Another aspect is that said case is cylindrical and oriented substantially parallel to a longitudinal axis of said flow tube.

Another aspect is that said case connect link means is elongated and substantially flat and has a longitudinal axis oriented substantially perpendicular to the longitudinal axis of said flow tube and said balance bar;

first and second ends of said elongated case connect link means couple said first and second ends of said balance bar to an inner wall of said case; and at least one out of plane bend in said elongated case connect link means that enables changes in the effective length of said elongated case connect link means in response to thermal differences between said flow tube and said case.

Another aspect is that said case connect means comprises:

a first and a second case connect link positioned at each end of said balance bar on opposite sides of said balance bar;

first and second ends on each of said case connect links that couple said first and second ends of said balance bar to said inner wall of said case.

Another aspect is that said case connect link means comprises a first and a second substantially circular diaphragm positioned at each end of said balance bar;

each diaphragm having a surface whose outer extremity couples said first and second ends of said balance bar to an inner wall of said case; and at least one out of plane bend in said surface of said diaphragm that enables changes in the effective diameter of said diaphragm in response to thermal differences between said flow tube and said case.

Another aspect is that said case connect link means is elongated and has a surface that couples said first and second ends of said balance bar to an inner wall of said case; and a plurality of out of plane bends in said surface of said elongated case connect link means that enable changes in the effective dimensions of said elongated case connect link means in response to thermal differences between said flow tube and said case.

Another aspect is that the flow tube has constant diameter for the entire length of the flowmeter.

Another aspect is that said case connect link means is elongated and has a bowed surface that enables said case connect means to change its effective length in response to thermal differences between said flow tube and said case;

ends of said bowed surface of said elongated case connect link means couple said first and second ends of said balance bar to an inner wall of said case.

Another aspect is that said case connect link means comprises a first case connect link means and a second case connect link means;

a first end of said case connect means couples one side of said inner wall of said case to a first side of said balance bar;

a second end of said case connect means couples an opposing side of said inner wall of said case to a second side of said balance bar; and a middle portion of said case connect means defines a brace bar that couples said flow tube to said balance bar.

Another aspect is a Coriolis flowmeter comprising:

a straight flow tube;

a cylindrical balance bar surrounding said flow tube and oriented substantially parallel to the longitudinal axis of said flow tube;

first and second ends of said balance bar coupled to opposing near end portions of said flow tube;

a cylindrical case containing said balance bar and said flow tube and oriented substantially parallel to the longitudinal axis of said balance bar;

a first and a second circular diaphragm defining case connect link means coupled to each end of said balance bar and having a surface oriented substantially perpendicular to the longitudinal axis of said flow tube and balance bar;

the outer extremity of each said diaphragm couples said first and second ends of said balance bar to an inner wall of said case; and at least one out of plane bend in said surface of each said diaphragm enables changes in the effective diameter of each said diaphragm in response to thermal differences between said flow tube and said case.

Another aspect is that said each said diaphragm has an inner portion that defines a brace bar connecting said flow tube and said balance bar.

Another aspect of the invention is a method of operating a Coriolis flowmeter having a flow tube adapted to receive a material flow and generate output information pertaining to said material flow; said flowmeter further having a balance bar oriented substantially parallel to the longitudinal axis of said flow tube, first and second ends of said balance bar coupled by a brace bar to opposing near end portions of said flow tube, a case containing said flow tube and said balance bar; and case connect link means coupling each end of said balance bar case to inner wall portions of said case; tube; said method comprising the steps of:

vibrating said balance bar and said flow tube in phase opposition during a material flow condition of said flowmeter to generate said output information pertaining to said flowing material; and compensating said flowmeter for conditions of varying temperature differentials between said case and said flow tube by the provision of a surface of said case connect means containing an out of plane bend that facilitates changes in the effective dimensions of said case connect link means in response to said varying temperature differentials between said flow tube and said case.

SOLUTION

The above problem is solved and an advance in the art is achieved in accordance with the present invention which provides a case connect link that has an out of plane bend which permits it to expand/contract in response to the presence of thermal expansion/contraction without permanent damage to the case connect link or the flowmeter elements to which it is connected.

In accordance with a first exemplary embodiment, each case connect link comprises a thin member that is elongated and which extends between the interior wall of the flowmeter case and a brace bar or end of the balance bar. The case connect link is positioned transversely with respect to the brace bar so that the elongated axis of the case connect link is transverse to the longitudinal axis of the flow tube and is also transverse to the drive direction of the flow tube. The case connect link of the present invention contains at least one out of plane bend in the portion of the link extending from the brace bar end to the case inner wall. Each out of plane bend comprises a fold that permits each half of the case connect link to expand or contract in the radial direction in response to thermal differentials with no permanent structural deformation. The out of plane bend may also comprise one or more sharp creases, a series of pleats like an accordion or alternatively may comprise a bowed or arc configuration.

In accordance with another possible embodiment of the invention, the case connect link may comprise a diaphragm having at least one pleat or the like with the circumference of the diaphragm coupled to the inner walls of the case. The center portion of the diaphragm is connected to the junction of the brace bar, the flow tube and the balance bar. The end portion of the flow tube extends through a hole in the center of the diaphragm and is connected to the case ends.

The case connect link provided in accordance with the present invention can accommodate thermal differentials and deform or contract substantially in response to radial expansion/contraction of the flow tube and balance bar with no damage to the material comprising the case connect link. This enables a flowmeter equipped with the case connect link of the present invention to process materials in an environment in which high temperature differentials can exist between different parts of the flowmeter without causing structural damage to the case connect link or the members to which they are connected.

DESCRIPTION OF THE DRAWINGS

The above and other advantages and features of the invention may be better understood from a reading of the following detailed description thereof taken in conjunction with the drawings in which.

DETAILED DESCRIPTION

Figure 1:
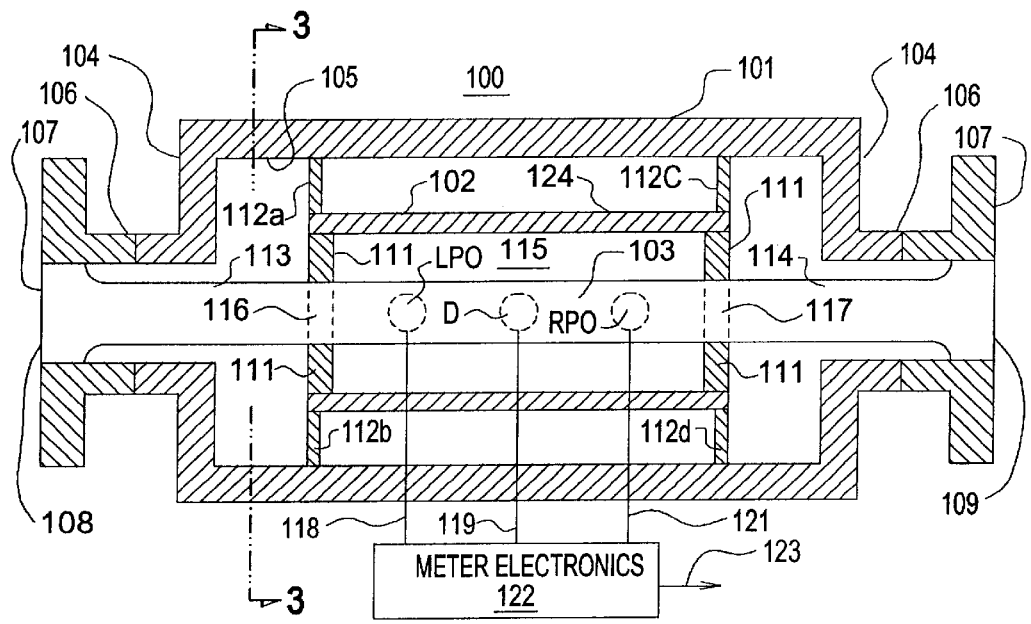
FIG. 1 discloses a prior art straight tube Coriolis flowmeter having a case connect link.

Description of FIG. 1

Coriolis flowmeters are characterized by a flow tube through which material flows while the flow tube is caused to vibrate at its resonant frequency. When material is not flowing, every point on the flow tube vibrates in phase with every other point on the flow tube. Two pick off devices positioned at different points on the flow tube generate sinusoidal signals that have the same phase when no material flows and have a phase difference between them when material flows. This phase difference is due to Coriolis forces generated by material flow through the vibrating flow tube. The magnitude of the phase difference between any two points along the length of the flow tube is substantially proportional to the mass flow rate of the material flow. Coriolis mass flowmeters employ signal processing that determines this phase difference and produces an output signal indicating the mass flow rate along with other information pertaining the material flow.

FIG. 1 discloses a prior art straight tube Coriolis flowmeter 100 having a case 101 that encloses the flowmeter elements including flow tube 103 and surrounding balance bar 102. Flow tube 103 extends axially within case 101 and is connected at its conical ends 126 to end flanges 107. End flanges 107 are connected by a neck portion 106 to the ends 104 of case 101. Flow tube 103 is surrounded by balance bar 102 and is connected to the ends of balance bar 102 by brace bars 111. The active portion 115 of flow tube 103 is intermediate brace bars 111. Flow tube elements 113 and 114 are intermediate the flanges 107 and brace bars 111. Elements 113 and 114 are termed the near end portions of flow tube 103. Elements 116 and 117 are the vibration end nodes of the active portion 115 of flow tube 103 during normal operating conditions of the flowmeter. The case connect links comprise elements $112_a$ and $112_b$ on the left and elements $112_c$ and $112_d$ on the right. The case connect link elements stabilize the vibrating elements of the flowmeter to maintain the vibration node in location 116 on the left and in location 117 on the right during normal operating conditions as subsequently described. Each case connect link 112 is connected at a first end to the outer wall 124 of balance bar 102 and at a second end to the inner wall 105 of case 101.

Flowmeter 100 further includes a driver D for vibrating flow tube 103 and balance bar 102 out of phase to each other at the resonant frequency of these elements and the material flowing within flow tube 103. Flowmeter 100 further includes a left pick off LPO and a right pick off RPO which are coupled to flow tube 103 and the balance bar 102 for detecting the Coriolis response of the vibrating material filled flow tube. Left pick off LPO, driver D, and right pick off RPO are connected to meter electronics 122 by conductors 118, 119 and 121, respectively. Meter electronics 122 applies a drive signal to driver D over path 119 to energize drive D so that it vibrates the material filled flow tube 103 and balance bar 102 out of phase at the resonant frequency of these elements. The output signals generated by left pick off LPO and right pick off RPO are extended over conductors 118 and 121, respectively, to meter electronics 122. Meter electronics 122 receive these signals and processes them to generate information, including the mass flow rate, of the material flowing in flow tube 103. The information generated by meter electronics 122 is applied over path 123 to a utilization circuit not shown.

The vibrating system of flowmeter 100 comprises flow tube 103, brace bar 111 and balance bar 102. The vibration nodes of these elements reside in the left and right brace bars 111 during the normal operation of the flowmeter in which material having a nominal density flows through flow tube 103. A vibrating system must always maintain its dynamic balance and under these conditions, dynamic balance is maintained with the vibration nodes 116 and 117 representing the location of no motion and being in brace bars 111. Under these conditions, the case connect links are not required to stabilize the vibrations of the internal elements of flowmeter 100 as long as the flowmeter 100 operates under ideal conditions. However, ideal conditions do not always exist and, the density of the flowing material may either increase or decrease from the nominal value in which the vibration nodes exist at location 116 and 117 of brace bar 111. When the material density increases, dynamic balance of the vibrating system is maintained when the vibration nodes move inwardly from locations 116 and 117 along flow tube 103. Conversely, for materials of a lighter density, the vibration nodes attempt to move outwardly to the left of location 116 and to the right of location 117 to maintain the vibrating structure in dynamic balance. If case connect links 112 were not present, the vibration nodes would move out of the brace bar 111 when the material density becomes heavier or lighter. Under such conditions and with the case connect links 112 not present, the brace bar 111 would vibrate transversely with respect to the longitudinal axis of flow tube 103. This would change the vibrating length of the flow tube 103 and change the flow sensitivity of the meter by altering the distance between the vibrating nodes and pick-offs LPO and RPO.

The presence of case connect links 112 minimizes the transverse vibrations of brace bar 111. It does this by permitting the forces associated with these attempted vibrations of brace bar 111 to be extended through case connect links 112 to the inner wall 105 of case 101. Case 101 is sufficiently massive that it can absorb these vibrations without any meaningful vibrations of the case itself. Thus, with case connect links 112 present, the vibration node of the vibrating structure comprising flow tube 103, brace bar 111, and balance bar 102 remains within brace bar 111 for all reasonable levels of material density that may be encountered by flow tube 103.

The prior art flowmeter of FIG. 1 has the disadvantage that temperature differentials between flow tube 103 and case 101 can cause structural damage to the internal elements of flow tube 103 when length of case connect links 112 attempts to expand or contract in response to the temperature differentials to which it is subjected. The reason for this is that one of its ends is connected to the inner wall 105 of case 101 which has a first temperature while its other end is effectively connected to flow tube 103 at a different temperature.

Figure 2:
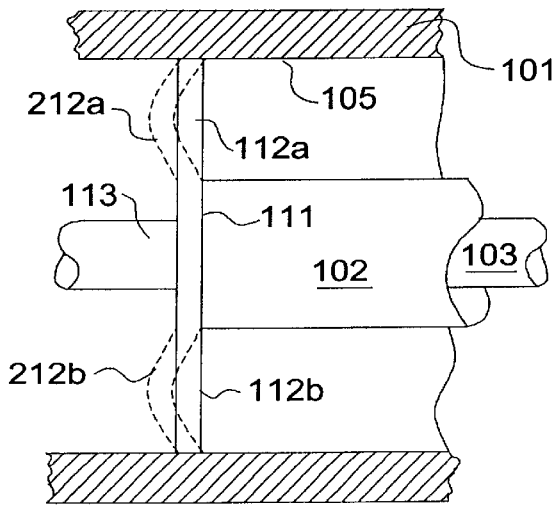
FIG. 2 discloses further details of the flowmeter of FIG. 1.

Description of FIG. 2

FIG. 2 illustrates the problem encountered by flowmeter 100 when the temperature of flow tube 103 is higher than the temperature of case 101. Under this condition, as shown in FIG. 2, brace bar 111, flow tube 103, and balance bar 102 increase in diameter due to thermal expansion. Case connect links 112a and 112b also attempt to increase their lengths since their end portions are connected to flow tube 103 having at a higher temperature. However, the end portions connected to the inner wall 105 of case 101 cannot move outward because case 101 is at a lower temperature and is extremely rigid. Under such conditions, case connect links $112_a$ and $112_b$ buckle and assume a bowed out position represented by the dotted lines $212_a$ and $212_b$. Or they may assume a bowed inward position (not shown) or one link could be bowed out and the other link bowed inward (not shown). The forces and stresses to which the case connect links 112 are subjected under these conditions may bend these elements beyond their normal limits of deformation and subject them to permanent mechanical damage in which the flowmeter accuracy is degraded.

Figure 3:
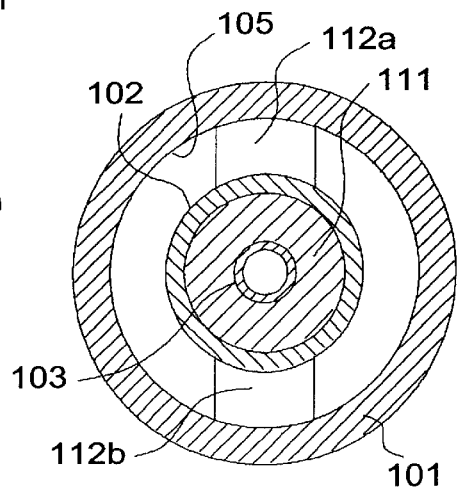
FIG. 3 discloses an end view of the flowmeter of FIG. 1 taken along section 3—3 on FIG. 1.

Description of FIG. 3

FIG. 3 is an end view taken along section line 3—3 of FIG. 1. It can be seen that, case connect links are flat and narrow planar members correcting the inner wall 105 of case 101 and the outer surface of balance bar 102. Brace bar 111 is a circular member connecting balance bar 102 with flow tube 103.

Figure 4:
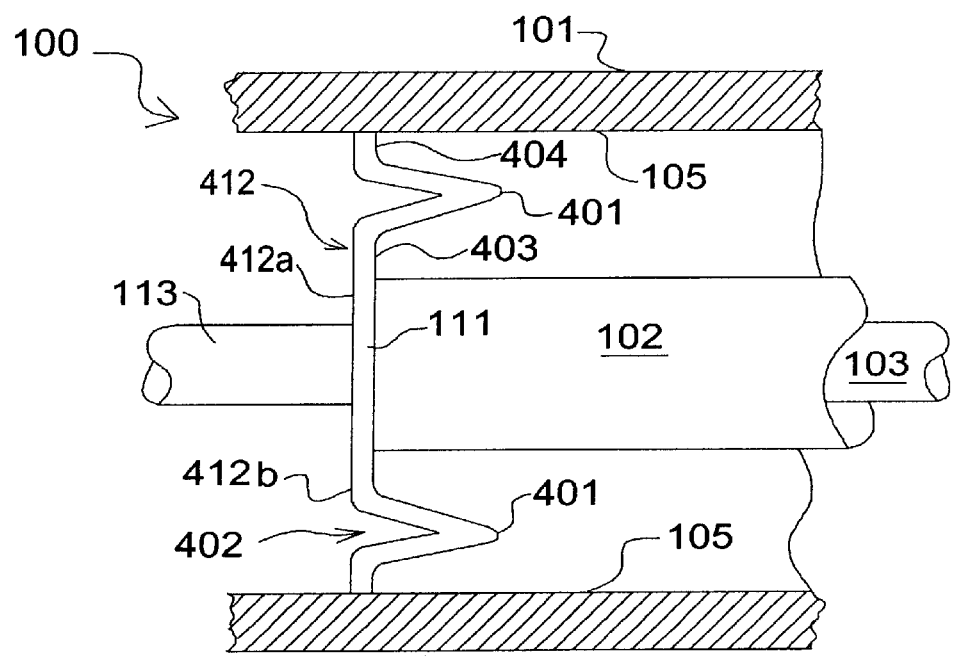
FIG. 4 discloses a straight tube Coriolis flowmeter having case connect links embodying the present invention.
Figure 5:
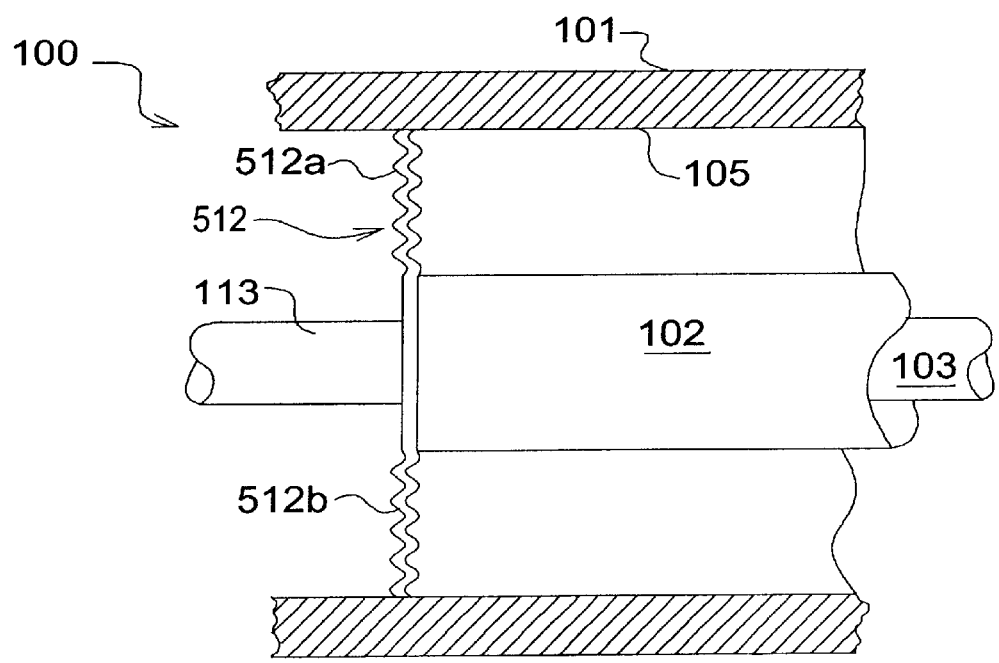
FIGS. 5, 6, and 7 disclose alternative embodiments of case connect links comprising the present invention.
Figure 6:
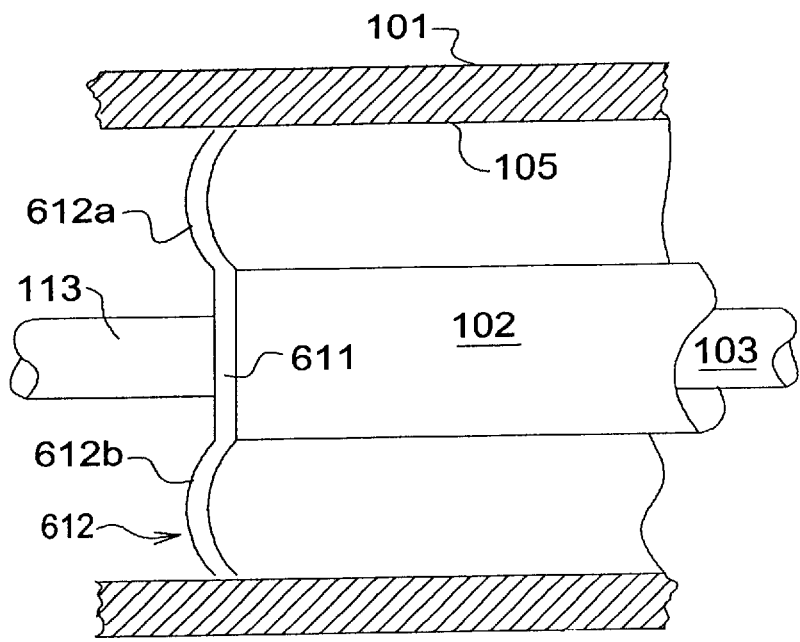

Description of FIGS. 4, 5, and 6

FIG. 4 illustrates a portion of a straight tube Coriolis flowmeter having a case connect link 412 at each end of balance bar 102. Case connect link 412 has case connect link segments $412_a$ and $412_b$ embodying the present invention. Case connect link segments $412_a$ and $412_b$ are unlike case connect link segments $112_a$ and $112_b$ of FIGS. 1 and 2 in that each case connect link segment $412_a$ and $412_b$, has a fold 401 in its mid-portion. Fold 401 permits case each connect link segment $412_a$ and $412_a$ to expand or contract In length without adversely effecting other elements of flowmeter 100, Let it be assumed that the temperature of the flow tube 103 decreases significantly due to cold material flowing through the flow tube. This being the case, balance bar 102, brace bar 111 and flow tube 103 contract and decrease in diameter. Also, the leg portion 403 of each case connect link 412 becomes much colder than the temperature of leg portion 404 who's outer end is connected to the inner wall 105 of case 101. Under these conditions, leg portion 404 remains constant in length while leg portion 403 becomes colder and contracts. In contracting, it causes the mouth portion 402 of fold 401 to open to accommodate the contraction of portion 303 and the decrease In diameter of balance bar 102 and flow tube 103. Similarly, if the flow tube temperature increases, this increase in temperature expands the balance bar 102 diameter, the flow tube 103 diameter and expands leg portion 403. In so doing, It causes the mouth portion 402 of fold 401 to close to accommodate the increase in diameter of balance bar 102 and flow tube 103 and increase in the length of leg portion 403.

It can be seen that changes in the temperature of the flow tube 103 are Imparted to brace bar 111, balance bar 102, and the leg 303 of the case connect link 412, However, because of the presence of fold element 401 and its mouth portion 402, case connect link 412 can accommodate contraction or expansion in length of leg portion 403 without any structural damage to the case connect link 412 or the elements to which it is connected. An end view of FIG. 4 would be similar to FIG. 3 except that link segments $112_a$, and $^{112}_b$, do not contain the fold element 401 of case connect link segments $412_a$ and $412_b$.

Flow tube 103 extends at a constant diameter for its entire length between its input end 108 and output end 109 in end flanges 107. This constant diameter is advantageous in that it enhances the cleanability of the flowmeter for applications where sanitation is desired FIG. 5 discloses an alternative embodiment of the invention In which the case connect links 512 ($512_a$ and $512_b$) do not have a single fold 401 but instead have a plurality of sinusoidal like undulations. These undulations permit case connect link 512 to expand or contract without structural damage to It or the structures to which it is connected.

The embodiment of FIG. 6 discloses another alternative embodiment of the invention wherein the case connect link 612 ($612_a$ and $612_b$) has a permanently bowed shape. This bowed shape permits case connect link 612 to either expand or contract in length without permanent structural damage either to Itself or to the flow tube elements to which it is connected. The center portion 611 of case connect link 612 ($612_a$ and $612_b$) couples the flow tube 103 to balance bar 102 and functions as a brace bar. Link 612 ($612_a$ and $612_b$) is narrow as shown for links $112_a$ and $112_b$ in FIG. 3.

Figure 7:
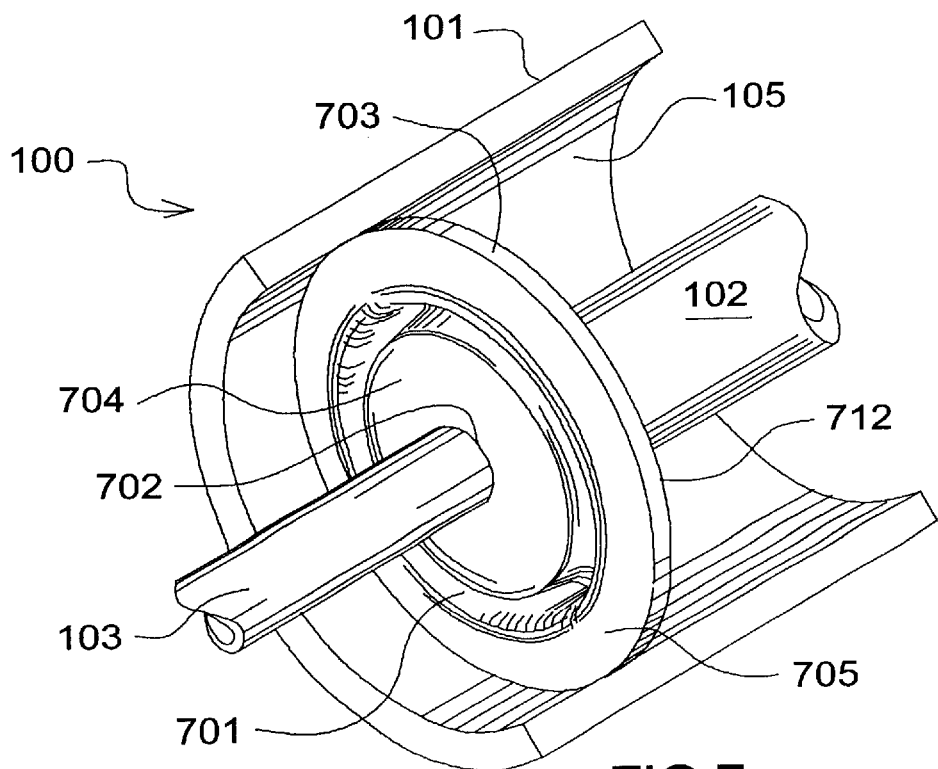

Description of FIG. 7

FIG. 7 discloses yet another alternative embodiment of the invention in which the case connect link comprises a circular diaphragm 712 having a center opening 702 for receiving flow tube 103. Circumference 703 of diaphragm 712 is affixed to the inner wall 105 of case 101. The back surface of diaphragm 712 is affixed to both flow tube 103 and the balance bar 102 so that diaphragm 703 performs the multiple functions of a brace bar and a case connect link. Surfaces 704 and 705 of diaphragm 712 have a fold element 701 which is similar to fold element 401 on FIG. 4. This fold element 701 permits diaphragm 712 to contract/expand in diameter in response to thermal changes of the flow tube diameter without permanent deformation to either itself or the structural elements of the flowmeter to which it is connected.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single tube flowmeters of irregular or curved configuration as well as Coriolis flowmeters having a plurality of flow tubes.

What is claimed is:

1. A Coriolis flowmeter comprising:
    a flow tube;
    a balance bar oriented substantially parallel to the longitudinal axis of said flow tube;
    first and second ends of said balance bar coupled to opposite near end portions of said flow tube;
    a case containing said balance bar and said flow tube;
    first and second case connect links couple said first and second ends of said balance bar to an inner wall of said case;
    at least one out of plane bend in said first and second case connect links for enabling changes In the length of said first and second case connect links in response to thermal differences between said flow tube and said case.

2. The Coriolis flowmeter of claim 1 in which:
   said flow tube is substantially straight.

3. The Coriolis flowmeter of claim 1 in which:
   said balance bar is substantially cylindrical and surrounds said flow tube.

4. The Coriolis flowmeter of claim 1 in which:
   said case is cylindrical and oriented substantially parallel to the longitudinal axis of said flow tube.

5. The Coriolis flowmeter of claim 1 in which:
   said first and second case connect links are elongated and substantially flat and have a longitudinal axis oriented substantially perpendicular to the longitudinal axis of said flow tube and said balance bar;
   first and second ends of said first and second case connect links couple said first and second ends of said balance bar to the inner wall of said case.

6. The Coriolis flowmeter of claim 1 in which:
   said first and second case connect links comprise a first and a second substantially Circular diaphragm positioned at each end of said balance bar;
   each diaphragm having a surface whose outer radial extremity couples said first and second ends of said balance bar to the inner wall of said case; and
   at least one out of plane bend in said surface of said diaphragm that enables changes In the diameter of said diaphragm in response to the thermal differences between said flow tube and said case.

7. The Coriolis flowmeter of claim 1 in which:
   said first and second case connect links are elongated and have a surface that couples said first and second ends of said balance bar to the inner wall of said case; and
   a plurality of out of plane bends in said surface of said first and second case connect links that enable changes in the effective dimensions of said first and second case connect links in response to the thermal differences between said flow tube and said case.

8. The Coriolis flowmeter of claim 1 in which said flow tube extends at a constant diameter for the entirety of the length of said flowmeter.

9. The Coriolis flowmeter of claim 1 in which:
   said first and second case connect links are elongated and have a bowed surface that enables the length of said first and second case connect links to change in response to the thermal differences between said flow tube and said case;
   ends of said bowed surface of said first and second case connect links couple said first and second ends of said balance bar to the Inner wall of said case.

10. The Coriolis flowmeter of claim 9 in which:
    a first end of said first and second case connect links couple one side of said inner wall of said case to a first side of said balance bar;
    a second end of said first and second case connect links couple a second side of said inner wall of said case to a second side of said balance bar; and
    a middle portion of said first and second case connect links define a brace bar that couples said flow tube to said balance bar.

11. A Coriolis flowmeter comprising:
    a straight flow tube;
    a cylindrical balance bar surrounding said flow tube and oriented substantially parallel to the longitudinal axis of said flow tube;
    first and second ends of said balance bar coupled to opposite near end portions of said flow tube;
    a cylindrical case containing said balance bar and said flow tube and oriented substantially parallel to the longitudinal axis of said balance bar;
    a first and a second circular diaphragm defining first and second case connect links coupled to each end of said balance bar and having a surface oriented substantially perpendicular to the longitudinal axis of said flow tube and balance bar;
    the outer extremity of each said diaphragm couples said first and second ends of said balance bar to an inner wall of said case; and
    at least one out of plane bend in said surface of each said diaphragm enables changes in the effective diameter of each said diaphragm in response to thermal differences between said flow tube and said case.

12. The Coriolis flowmeter of claim 11 in which said each said diaphragm has an inner portion that defines a brace bar connecting said flow tube and said balance bar.

13. A method of operating a Coriolis flowmeter having a flow tube adapted to receive a material flow and generate output information pertaining to said material flow; said flowmeter further having a balance bar oriented substantially parallel to the longitudinal axis of said flow tube, first and second ends of said balance bar coupled by a brace bar to opposite near end portions of said flow tube, a case containing said flow tube and said balance bar; and first and second case connect links coupling each end of said balance bar to inner wall portions of said case; said method comprising the steps of:
    vibrating said balance bar and said flow tube in phase opposition during a material flow condition of said flowmeter to generate said output information pertaining to said material flow; and compensating said flowmeter for conditions of varying temperature differentials between said case and said flow tube by the provision of a surface of said first and second case connect links containing an out of plane bend that facilitates changes in the effective dimensions of said first and second case connect links in response to said varying temperature differentials between said flow tube and said case.

* * * * *

UNITED STATES PATENT AND TRADEMARK OFFICE
CERTIFICATE OF CORRECTION

PATENT NO.    : 6,397,684 B1
DATED         : June 4, 2002
INVENTOR(S)   : Craig Brainerd Van Cleve It is certified that error appears in the above-identified patent and that said Letters Patent is hereby corrected as shown below:

Column 8,
Line 7, replace "link segment $412_a$ and $412_a$ to expand or contract In length" with
-- link segment $412_a$ and $412_b$ to expand or contract in length --
Line 20, replace "traction of portion 303 and the decrease In diameter of" with
-- traction of portion 303 and the decrease in diameter of --
Line 24, replace "expands leg portion 403. In so doing, It causes the mouth" with
-- expands leg portion 403. In so doing, it causes the mouth --
Line 29, replace "tube 103 are Imparted to brace bar 111, balance bar 102, and" with
-- tube 103 are imparted to brace bar 111, balance bar 102, and --
Line 30, replace "the leg 303 of the case connect link 412, However, because" with
-- the leg 303 of the case connect link 412. However, because --
Line 36, replace "similar to FIG. 3 except that link segments $112_a$, and $^{112}_b$, do" with
-- similar to FIG. 3 except that link segments $112_a$ and $112_b$ do --
Line 45, replace "tion In which the case connect links 512 ($512_a$ and $512_b$) do" with
-- tion in which the case connect links 512 ($512_a$ and $512_b$) do --
Line 49, replace "damage to It or the structures to which it is connected." with
-- damage to it or the structures to which it is connected. --
Line 55, replace "either to Itself or to flow tube elements to which it is" with
-- either to itself or to flow tube elements to which it is --

Column 9,
Line 32, replace "connect links for enabling changes In the length of said" with
-- connect links for enabling changes in the length of said --
Line 54, replace "and a second substantially Circular diaphragm posi-" with
-- and a second substantially circular diaphragm posi- --
Line 61, replace "diaphragm that enables changes In the diameter of said" with
-- diaphragm that enables changes in the diameter of said --

UNITED STATES PATENT AND TRADEMARK OFFICE
CERTIFICATE OF CORRECTION

PATENT NO. : 6,397,684 B1
DATED : June 4, 2002
INVENTOR(S) : Craig Brainerd Van Cleve It is certified that error appears in the above-identified patent and that said Letters Patent is hereby corrected as shown below:

Column 10,
Line 18, replace "balance bar to the Inner wall of said case." with
-- balance bar to the inner wall of said case. --

Signed and Sealed this

Twenty-second Day of April, 2003

JAMES E. ROGAN
*Director of the United States Patent and Trademark Office*